United States Patent
Starr (10) Patent No.: US 8,479,117 B2
(45) Date of Patent: Jul. 2, 2013

(54) INTELLIGENT WINDOW SIZING FOR GRAPHICAL USER INTERFACES

(75) Inventor: Ephraim D. Starr, Rancho Palos Verdes, CA (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 176 days.

(21) Appl. No.: 12/793,836

(22) Filed: Jun. 4, 2010

(65) Prior Publication Data
US 2011/0302528 A1 Dec. 8, 2011

(51) Int. Cl.
*G06F 3/048* (2006.01)

(52) U.S. Cl.
USPC ........................................ 715/800; 715/798

(58) Field of Classification Search
USPC .................................. 715/800, 798
See application file for complete search history.

(56) References Cited

U.S. PATENT DOCUMENTS

| | | | | |
|---|---|---|---|---|
| 5,497,454 A * | 3/1996 | Bates et al. | | 715/799 |
| 5,734,915 A * | 3/1998 | Roewer | | 715/202 |
| 5,760,772 A | 6/1998 | Austin | | 345/342 |
| 5,796,401 A * | 8/1998 | Winer | | 345/619 |
| 6,043,817 A * | 3/2000 | Bolnick et al. | | 715/788 |
| 6,075,531 A * | 6/2000 | DeStefano | | 715/788 |
| 6,215,490 B1 * | 4/2001 | Kaply | | 715/788 |
| 6,891,553 B2 * | 5/2005 | White et al. | | 715/800 |
| 7,051,012 B2 * | 5/2006 | Cole et al. | | 705/3 |
| 7,117,452 B1 * | 10/2006 | Pavelski et al. | | 715/792 |
| 7,188,319 B2 * | 3/2007 | Amadio et al. | | 715/835 |
| 7,263,661 B2 * | 8/2007 | Chavers et al. | | 715/744 |
| 7,269,797 B1 * | 9/2007 | Bertocci et al. | | 715/783 |
| 7,287,233 B2 * | 10/2007 | Arend et al. | | 715/795 |
| 7,395,510 B2 * | 7/2008 | Diwan et al. | | 715/801 |
| 7,454,711 B2 * | 11/2008 | Angiulo et al. | | 715/760 |
| 7,735,004 B2 * | 6/2010 | Kobashi et al. | | 715/243 |
| 7,788,579 B2 * | 8/2010 | Berkner et al. | | 715/243 |
| 7,788,595 B2 * | 8/2010 | Biwer et al. | | 715/792 |
| 7,844,917 B2 * | 11/2010 | Rigolet | | 715/798 |
| 7,853,877 B2 * | 12/2010 | Giesen et al. | | 715/711 |
| 7,900,139 B2 * | 3/2011 | Hosotsubo | | 715/247 |
| 7,917,864 B2 * | 3/2011 | Bertram et al. | | 715/777 |
| 7,921,365 B2 * | 4/2011 | Sauve et al. | | 715/738 |
| 7,987,431 B2 * | 7/2011 | Santoro et al. | | 715/765 |
| 8,001,479 B2 * | 8/2011 | Katsuranis et al. | | 715/763 |
| 8,065,629 B1 * | 11/2011 | Ragan | | 715/799 |
| 8,151,204 B2 * | 4/2012 | Lusen et al. | | 715/769 |
| 2005/0022135 A1 * | 1/2005 | de Waal | | 715/788 |
| 2006/0015804 A1 * | 1/2006 | Barton et al. | | 715/503 |
| 2006/0146059 A1 * | 7/2006 | Inoue et al. | | 345/546 |
| 2008/0024666 A1 * | 1/2008 | Sudo et al. | | 348/565 |
| 2009/0172587 A1 * | 7/2009 | Carlisle et al. | | 715/781 |

OTHER PUBLICATIONS

Joan Lambert, Microsoft Office 2008 for Mac Step by Step, Pub: Oct. 15, 2008, Microsoft Press, see atttached of: p. 1-13 of "Practice Viewing and Moving Around in Documents" and pp. 1-2 of "View and Move Around in Word Documents".*
Microsoft Press, Microsoft Computer Dictionary, Pub: Mar. 15, 2001, Microsoft Press, Fifth Edition, pp. 1-33 of attached.*

(Continued)

*Primary Examiner* — David Phantana Angkool
(74) *Attorney, Agent, or Firm* — John L. Rogitz (57) ABSTRACT

A device displays a drop down detection area. When the computing device detects the presence of a cursor hovering over the drop down detection area, the computing device displays a tiling navigator on the display, which includes multiple window resizing options for a user to select in order to resize a window to particular display locations on the display.

17 Claims, 9 Drawing Sheets

OTHER PUBLICATIONS

Joan Lambert, Microsoft Office 2008 for Mac Step by Step, Pub: Oct. 15, 2008, Microsoft Press, see atttached of: p. 1"Find Your Way Around File Windows".*

WinsSplit Revolution 9.02, WinSplit Revolution, 2010, http://winsplit-revolution.com, 3 pages.

* cited by examiner

INTELLIGENT WINDOW SIZING FOR GRAPHICAL USER INTERFACES

TECHNICAL FIELD

The present disclosure relates to systems, methods and program products that provide the ability to resize windows displayed on display devices.

BACKGROUND

A computing device typically provides a graphical user interface (GUI) that allows a user to interact with the computing device through items such as graphical icons, visual indicators, "desktops" and windows. The graphical user interface is typically designed to enhance user-efficiency and ease-of-use to operate underlying applications. In many cases, a user may invoke multiple applications and/or multiple instances of an application that, in turn, cause the computing device to open and display multiple windows on the computing device's display.

SUMMARY

A device displays a drop down detection area. When the computing device detects the presence of a cursor hovering over the drop down detection area, the computing device displays a tiling navigator on the display, which includes multiple window resizing options for a user to select in order to resize a window to particular display locations on the display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will further explain and expand the definitions of the various aspects and embodiments of the disclosure as necessary.

Figure 1:
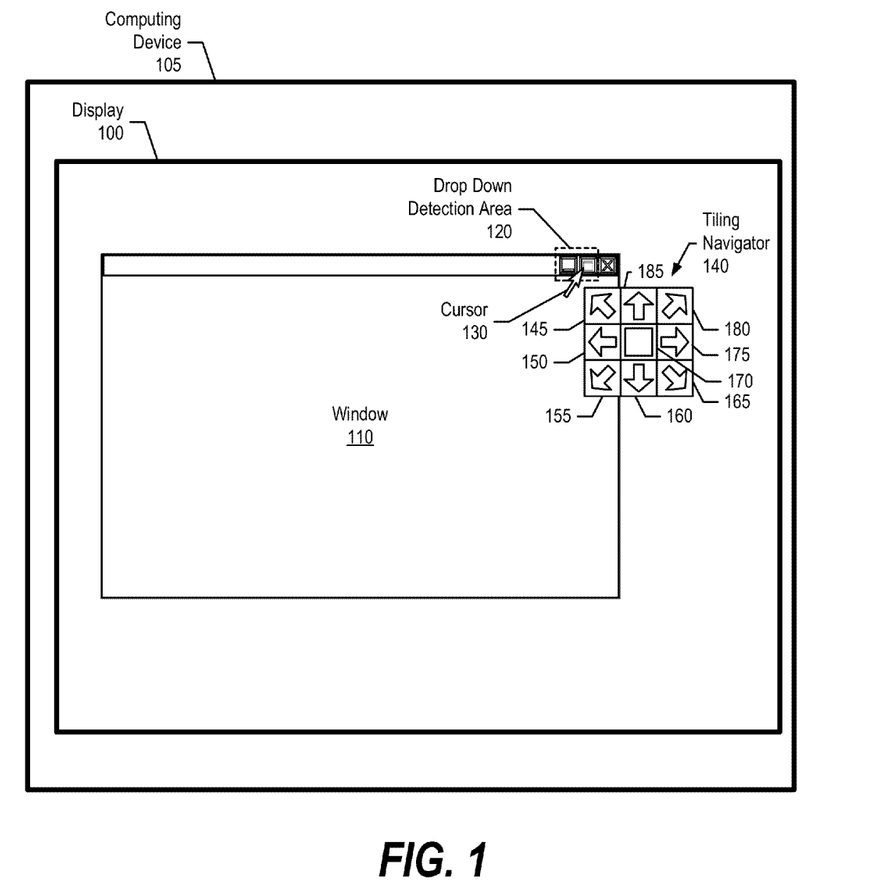
FIG. 1 shows an embodiment of a tiling navigator for resizing a window to a particular display location on a display device.

FIG. 1 shows an embodiment of a tiling navigator for resizing a window to a particular display location on a display device. Display 100 displays window 110 at an initial location, such as the center of display 100. Display 100 may be, for example, a computer display, a television monitor, a mobile phone display, a netbook display, etc. Window 110 includes drop down detection area 120, whose boundary may or may not be viewable. For example, drop down detection area 120 may include window 110's "minimize" and/or "maximize" icons. Drop down detection area 120 may also be in the form of a separate icon, such as tiling navigator icon 430 shown in FIG. 4B. Drop down detection area 120 may also be located as a separate element of a graphical user interface that is not associated with a window, and it may be located anywhere on the display 100. As computer users may be accustomed to using maximize/minimize icons associated with windows, however, FIG. 1 depicts a convenient location for drop down detection area 120.

When a user wishes to relocate window 110 to a different display location on display 100, such as on the left half of display 100, the user places cursor 130 over drop down detection area 120. Computing device 105 detects cursor 130 hovering over drop down detection area 120 and, in turn, displays tiling navigator 140. In one embodiment, computing device 105 is programmed to display the tiling navigator 140 only after detecting the presence of cursor 130 over drop down detection area 120 for at least a certain amount of time—for example, 0.5 seconds. This embodiment helps avoid unintended or undesired display of the tiling navigator 140. In another embodiment, however, computing device 105 is programmed to display the tiling navigator 140 rapidly upon detection of cursor 130 over drop down detection area 120. This embodiment prioritizes responsiveness. Once displayed, tiling navigator 140 includes window resizing options 145-185 for the user to select. Window resizing options 145, 155, 165, and 180 allow a user to resize window 110 to a particular corner (e.g., one quarter) of display 100. Window resizing options 150, 160, 175, and 185 allow the user to resize window 110 to a particular half of display 100. And, window resizing option 170 allows the user to resize window 110 to a full size screen.

In one embodiment, when a previously resized window resides on display 100, window resizing option 170 may be utilized to automatically resize window 110 based upon the display location of the previously resized window. For example, if the previously resized window is displayed on the left half of display 100, a user may select window resize option 170 to automatically display window 110 on the right half of display 100 (see FIGS. 2A-2C and corresponding text for further details).

In another embodiment, when a previously resized window resides at a display location corresponding to one of the window resizing options, computing device 105 may disable the corresponding window resizing option in order to prevent the user from selecting a window resizing option that corresponds to a display location currently in use by another window.

In yet another embodiment, a tiling navigator includes predefined window arrangements that enable a user to select a window location from one of the predefined window arrangements. In this embodiment, computing device 105 may disable window locations that include a previously resized window (see FIG. 5B and corresponding text for further details).

Figure 2A:
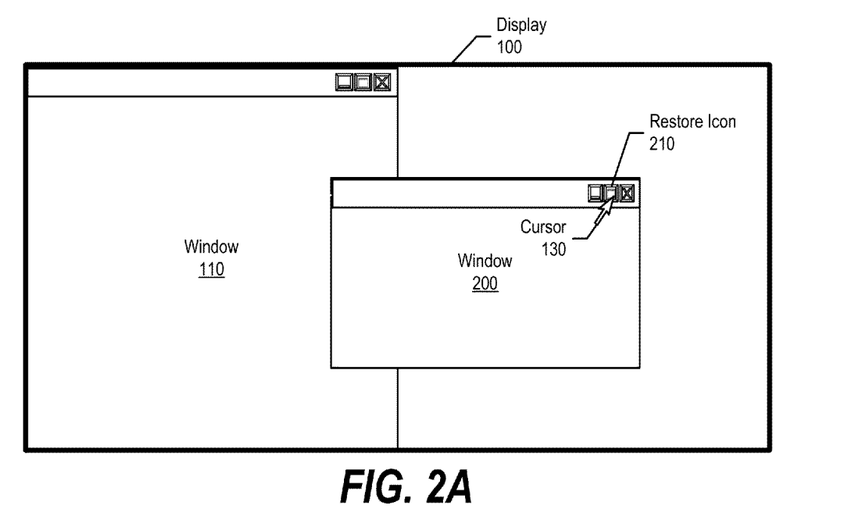
FIG. 2A shows an embodiment of a display device displaying a first window at a particular display location and a mechanism to automatically resize a second window based upon the display location of the first window.

FIG. 2A shows an embodiment of a display device displaying a first window at a particular display location and a user performing actions to automatically resize a second window based upon the display location of the first window. FIG. 2A shows window 110 being displayed on the left half of display 100. This embodiment corresponds to a user selecting window resizing option 150 shown in FIG. 1, which instructs computer 105 to display window 110 at the corresponding display location.

When a user opens window 200, the user may automatically resize window 200 based upon the existing display location of window 110. FIG. 2A shows an embodiment where the user may select restore icon 210, which instructs computing device 105 to automatically resize window 200 based upon the display location of window 110 (e.g., resize window 200 to the right half of display 100, see FIG. 7 and corresponding text for further details). In one embodiment, window 200 may include a separate auto resize option icon for the user to select (see FIG. 2B and corresponding text for further details). In yet another embodiment, when the user places cursor 130 over window 200's drop down detection area, a tiling navigator may be displayed that includes an auto resize option (see FIG. 2C and corresponding text for further details).

Figure 2B:
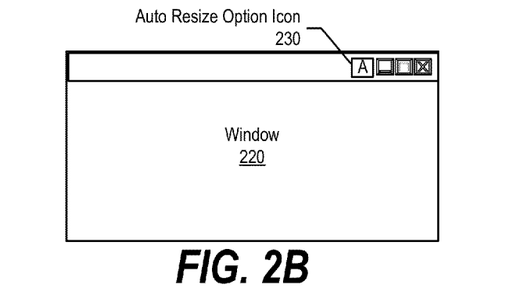
FIG. 2B shows an embodiment of an auto resize option icon used to automatically resize a window.

FIG. 2B shows an embodiment of automatically resizing a window using an auto resize option icon. Window 220 includes auto resize option icon 230, which a user may select to automatically resize window 220 based upon previously resized windows, such as that discussed in FIG. 2A. In this embodiment, when a window is resized, subsequently opened windows may include auto resize option icon 230 to provide a user with the ability to automatically resize the subsequently opened windows.

Figure 2C:
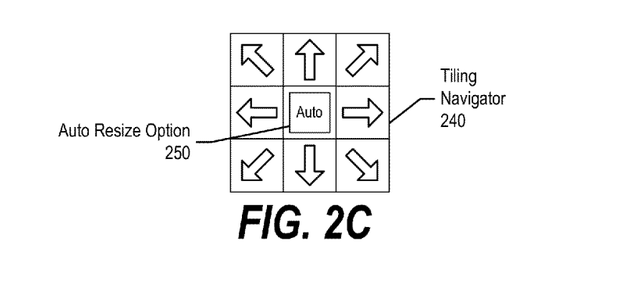
FIG. 2C shows an embodiment of a tiling navigator that includes an auto resize option to automatically resize a window.

FIG. 2C shows an embodiment of automatically resizing a window using a tiling navigator that includes an auto resize option. Tiling navigator 240 includes auto resize option 250, which a user may select to automatically resize a window based upon previously resized windows, such as that discussed in FIGS. 2A and 2B. In this embodiment, referring to FIG. 1, when a user places cursor 130 over drop down detection area 120 and display 100 already displays a previously resized window, computing device 105 displays tiling navigator 240 (including auto resize option 250), which provides the user with the option of automatically resizing window 110 based upon the display location of the previously resized window.

Figure 3:
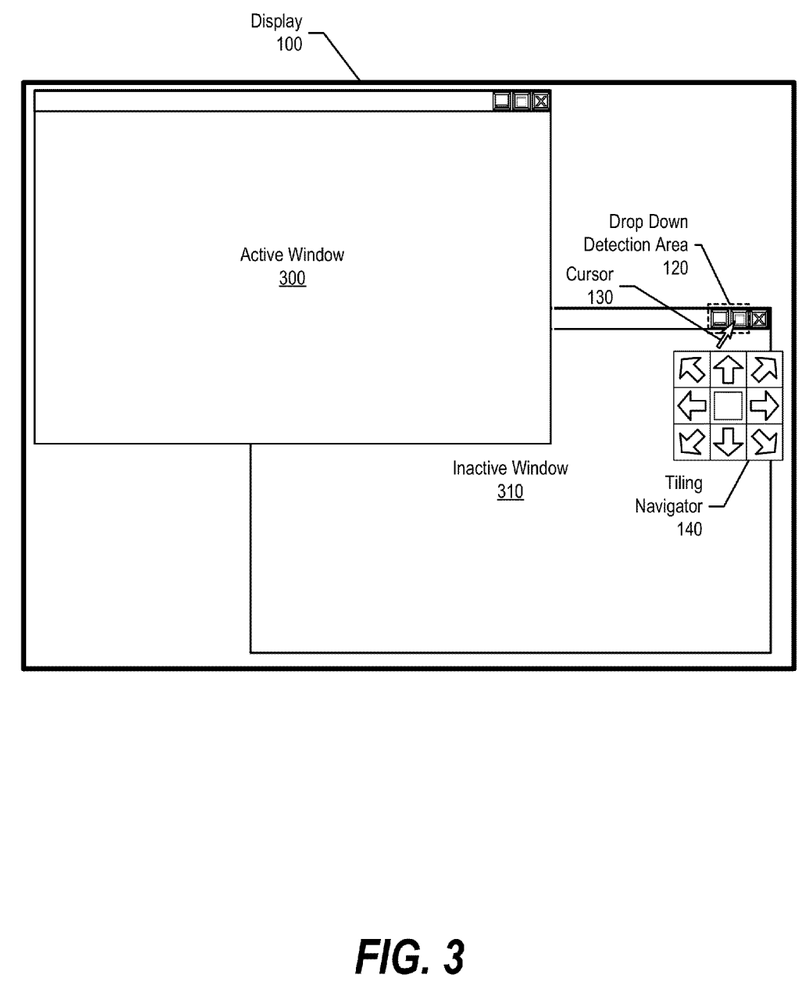
FIG. 3 shows an embodiment of a method for displaying a tiling navigator when a cursor hovers over an inactive window's drop down detection area.

FIG. 3 shows an embodiment of displaying a tiling navigator when a cursor hovers over an inactive window's drop down detection area. Display 100 includes active window 300 and inactive window 310. As those skilled in the art can appreciate, active window 300 is a currently focused window to which mouse clicks and keystrokes are sent.

FIG. 3 shows that, even though window 310 is inactive, when a user places cursor 130 to hover over drop down detection area 120, tiling navigator 140 is displayed. In turn, the user may select one of tiling navigator 140's window resizing options to resize inactive window 310 to a particular display location. In one embodiment, a user may configure navigational options to change inactive window 310 to an active window after inactive window 310 is resized to the particular display location.

Figure 4A:
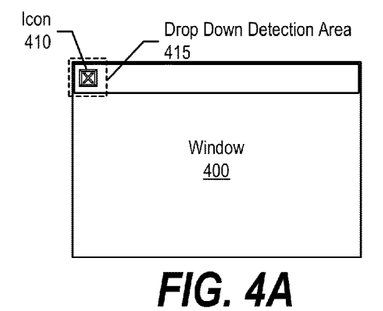
FIG. 4A shows an embodiment of a window that includes a drop down detection area in a different title bar location.

FIG. 4A shows an embodiment of a window that includes a drop down detection area in a different title bar location. Window 400 includes icon 410 on the left side of its title bar compared with window 110's icons that are placed on the right side of its title bar. In this embodiment, drop down detection area 415 may reside around icon 410 and, when a user places a cursor over drop down detection area 415, a corresponding tiling navigator is displayed, which provides the user with the ability to resize window 400 to a particular display location as discussed herein.

Figure 4B:
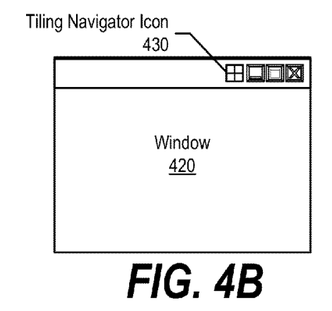
FIG. 4B shows an embodiment of a window that includes a tiling navigator icon.

FIG. 4B shows a window that includes a tiling navigator icon. In one embodiment, the user may place a cursor over (hover over) tiling navigator icon 430 to display a tiling navigator, thus providing the user with the ability to resize window 420 to a particular display location.

In another embodiment, window 420 includes tiling navigator icon 430 that a user can actively select in order to display a corresponding tiling navigator for resizing window 420. This embodiment is provided for users who prefer active selection.

Figure 4C:
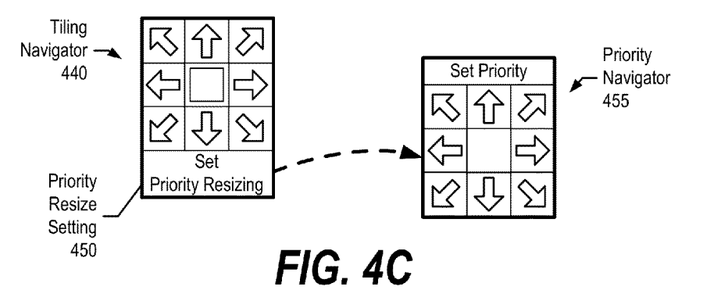
FIG. 4C shows an embodiment of a tiling navigator that allows a user to set a priority resizing display location for a window.

FIG. 4C shows an embodiment of a tiling navigator that allows a user to set a window's priority resizing display location. Tiling navigator 440 includes priority resize setting 450, which informs computing device 105 that the user wishes to set a priority resizing display location for a corresponding window. For example, a user may wish to configure a particular spreadsheet to prioritize resizing to the left half of a computer screen.

When a user selects priority resize setting 450, priority navigator 455 is displayed, which allows the user to select a priority resizing option (e.g., left half of display, upper right corner of display, etc.). Once the user selects the priority resizing option, computing device 105 resizes the window accordingly (see FIG. 4D and corresponding text for further details). In addition, in one embodiment, the next time that the user opens the window and places a cursor over the window's drop down detection area, the tiling navigator includes a priority resize selection, which the user may select to resize the window to its prioritized resizing display location (see FIG. 4D and corresponding text for further details).

Figure 4D:
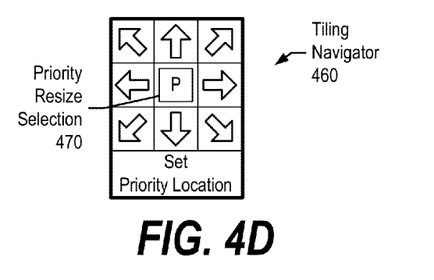
FIG. 4D shows an embodiment of a tiling navigator that includes a priority resize option that corresponds to a previously selected priority resizing display location.

FIG. 4D shows an embodiment of a tiling navigator that includes a priority resize option corresponding to a previously selected priority resizing display location (discussed in FIG. 4C). Tiling navigator 460 includes priority resize selection 470, which a user selects in order to resize a window to a prioritized resizing display location (see FIG. 4C and corresponding text for further details). As those skilled in the art can appreciate, other embodiments are available to allow a user to quickly resize a window according to a priority resizing option, such as including a separate icon in a title bar (similar to that shown in FIG. 4B). Additionally, priority navigator 455 may allow a user to select a series of prioritized locations. For example, priority navigator 455 may allow a user to select the left half of display 100 as the top priority, and the right half as the second priority location. In this example, two back to back user selections of priority resize selector 470 will result in the first window to be located on the left half of display 100, and the second window on the right half location.

Figure 5A:
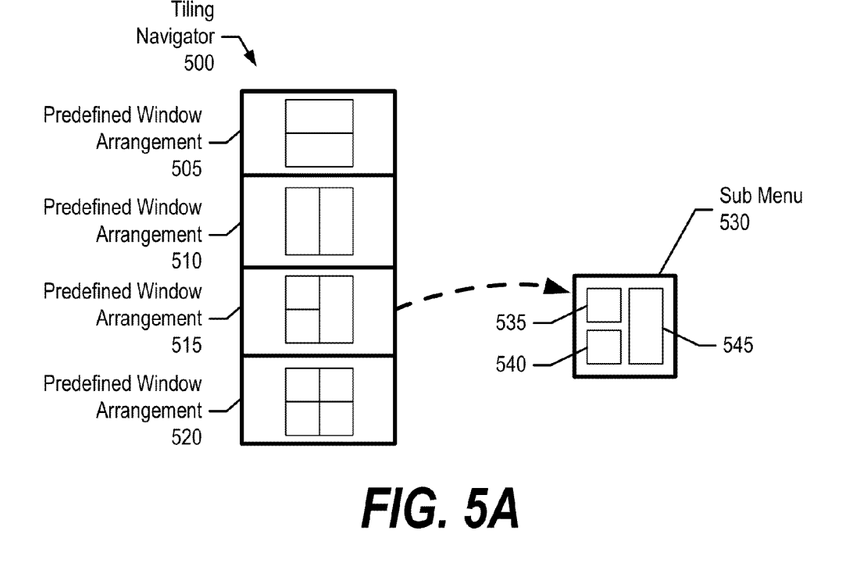
FIG. 5A shows an embodiment of a tiling navigator that includes predefined window arrangements.

FIG. 5A shows an embodiment of a tiling navigator that includes predefined window arrangements. Tiling navigator 500 includes predefined window arrangements 505-520. Each of the predefined window arrangements shows a particular arrangement of windows to be displayed on a display device, such as display 100 shown in FIG. 1.

When a user selects a predefined window arrangement, the computing device may display sub menu 530, which allows the user to select a particular predefined resizing display location for the corresponding window. For example, the user may select predefined resizing option 535 in order to have the corresponding window be displayed at the upper left of a display device. In one embodiment, a predefined resizing option is disabled once a window has been resized to the corresponding display location in order to prevent a user from resizing a subsequent window to the same display location (see FIG. 5B and corresponding text for further details).

Figure 5B:
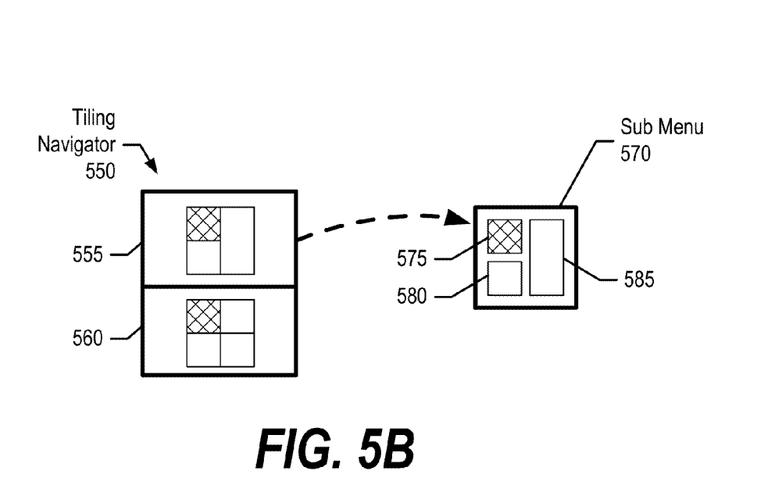
FIG. 5B shows a tiling navigator with predefined window arrangements that include a disabled predefined resizing option.

FIG. 5B shows a tiling navigator with predefined window arrangements that include a disabled predefined resizing option. Tiling navigator 550 includes, for example, predefined window arrangements 555 and 560. Each of predefined window arrangements 555 and 560 shows a disabled predefined resizing option (upper left display location), which results from a user having resized a previous window to the particular predefined resizing display location. For example, referring to FIG. 5A, a user may select predefined resizing option 535 to resize a corresponding window to the upper left display location. Continuing with this example, and referring to FIG. 5B, the upper left predefined resizing option is disabled in both predefined window arrangement options 555 and 560.

In turn, when a user selects predefined window arrangement option 555 and sub menu 570 is displayed, a user may select predefined resizing options 580 or 585, but is prohibited from selecting predefined resizing option 575. The disabled predefined resizing option may be represented, for example, as grayed out or with an "X" drawn through it in order to depict its disabled status.

For added convenience, in one embodiment, tiling navigator 550 depicts available predefined resizing options by using thumbnail sketches of open windows. Various permutations are calculated and the options depicted for the user's selection. If the user currently has many windows open, such that there would be more than, for example, ten permutations, priority options are displayed or, alternatively, windows are grouped based on application type in order to reduce available permutations. For example, if a user has five open windows, including two spreadsheet instances and three word processing instances, the available permutations may be reduced by depicting thumbnail sketches in tiling navigator 550 of only the most-recently-active instances of each application. Then, the user may resize the windows to show only the most-recently-active instances of each application, but with freedom to toggle between instances in the same window location. Alternatively, as mentioned, permutations may be reduced using priority options. In one embodiment, the user may define priority options so that the tiling navigator 550 will depict available predefined resizing options using thumbnail sketches of that user's preferred window or applications. In another embodiment, the information handling system may be programmed such that the tiling navigator 550 will depict available predefined resizing options using priority options determined based on usage history.

In still another embodiment, tiling navigator 550 depicts available predefined resizing options by using icons that represent applications (e.g., spreadsheet icon, word processing icon, Internet browser icon, etc.). This embodiment, by virtue of typically simple representations used in icons, may use less computational power than embodiments that use thumbnail sketches, or may provide a simpler (less cluttered) display.

But these are largely matters of user preference, and thus user-choice of the available tiling navigator 550 display options may be provided.

Figure 6:
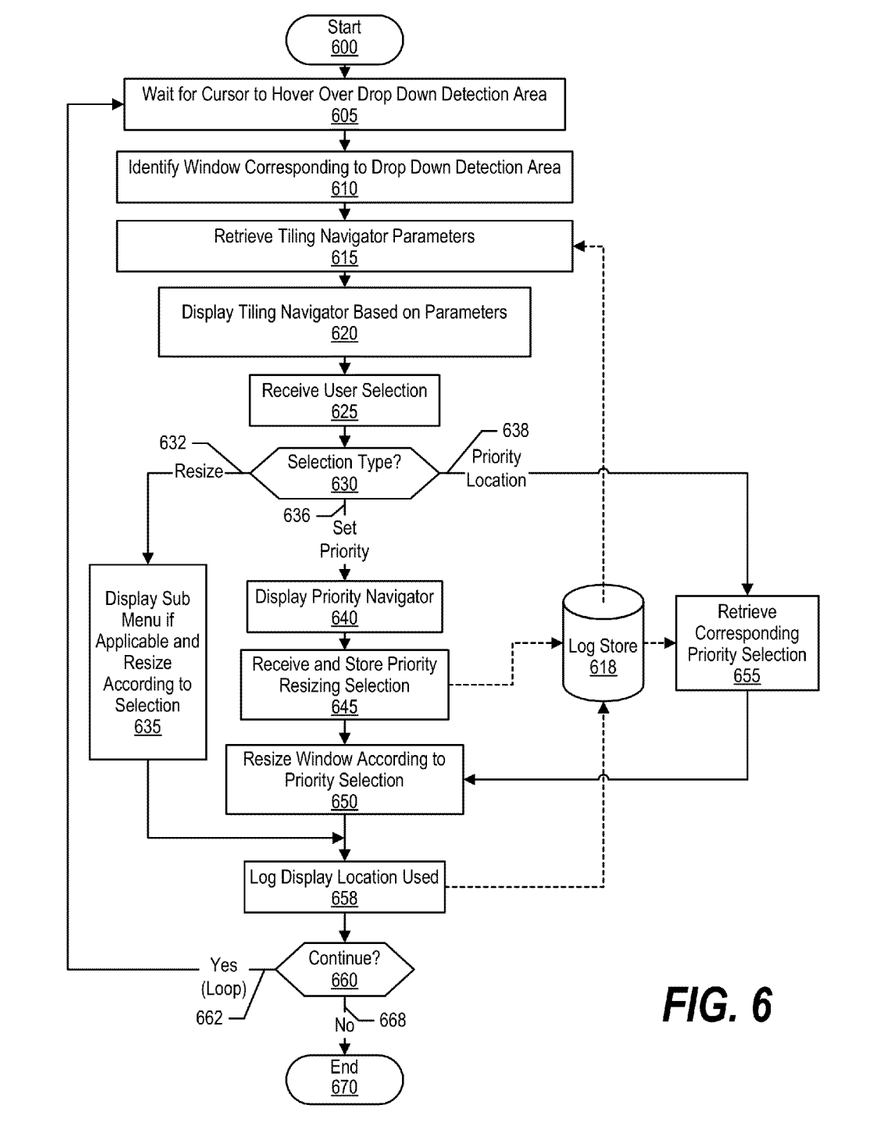
FIG. 6 is a flowchart showing an example of steps taken to resize a window.

FIG. 6 is a flowchart showing an example of steps taken to resize a window. Processing commences at 600, whereupon processing waits for a cursor to hover over a window's drop down detection area (step 605). The drop down detection area may be, for example, above the window's maximize/minimize icons or over a tiling navigator icon. In one embodiment, a user may select a tiling navigator icon to invoke a tiling navigator to be displayed (see FIGS. 1, 4A-4B, and corresponding text for further details).

At step 610, processing identifies the window that corresponds to the drop down detection area over which the cursor hovers. In one embodiment, the window may be an active window or an inactive window (see FIG. 3 and corresponding text for further details). Next, at step 615, processing retrieves tiling navigator parameters from log store 618. The tiling parameters may include, for example, a priority resizing display location for the identified window. The tiling parameters may also indicate whether to display predefined window arrangement options and/or whether to disable one or more priority resizing options, such as those shown in FIGS. 5A and 5B. Processing then displays a tiling navigator based upon the retrieved tiling parameters (step 620), such as, for example, tiling navigators 140, 240, 440, 500, or 550 discussed earlier.

At step 625, processing receives a user selection from the user. A determination is made as to whether the user wishes to resize the window based upon a resizing option; set a priority resizing display location; or resize the window based upon a previously configured priority resizing display location (decision 630). If the user wishes to resize the window based upon a selected window resizing option, decision 630 branches to "Resize" branch 632, whereupon processing displays a sub-menu if applicable (e.g., sub menu's 530 or 570 shown in FIG. 5), and resizes the window accordingly (step 635).

On the other hand, if the user wishes to set a priority resizing display location, decision 630 branches to "Set Priority" branch 636, whereupon processing displays a priority navigator at step 640, such as that shown in FIG. 4C. Processing receives a priority resizing display location selection from the user and stores the priority resizing display location in log store 618 at step 645. While storing, processing also associates the priority resizing display location to the window for future reference. Processing then resizes the window according to the priority resizing display location at step 650.

On the other hand, if the user wishes to resize the window according to a previously configured priority resizing display location, decision 630 branches to "priority location" branch 638, whereupon processing retrieves a corresponding priority resizing display location from log store 618 (step 655), and resizes the window according to the priority resizing display location at step 650.

At step 658, processing logs the display location in log store 618 to which the window was resized. This allows processing to identify display locations that are in use and whether to disable one or more predefined resizing options (see FIGS. 5A-5B, 7, and corresponding text for further details).

A determination is made as to whether to continue processing window resizing requests (decision 660). If processing should continue, decision 660 branches to "Yes" branch 662, which loops back to continue processing window resizing requests. This looping continues until processing should stop processing window resizing requests, at which point decision 660 branches to "No" branch 668, whereupon processing ends at 670.

Figure 7:
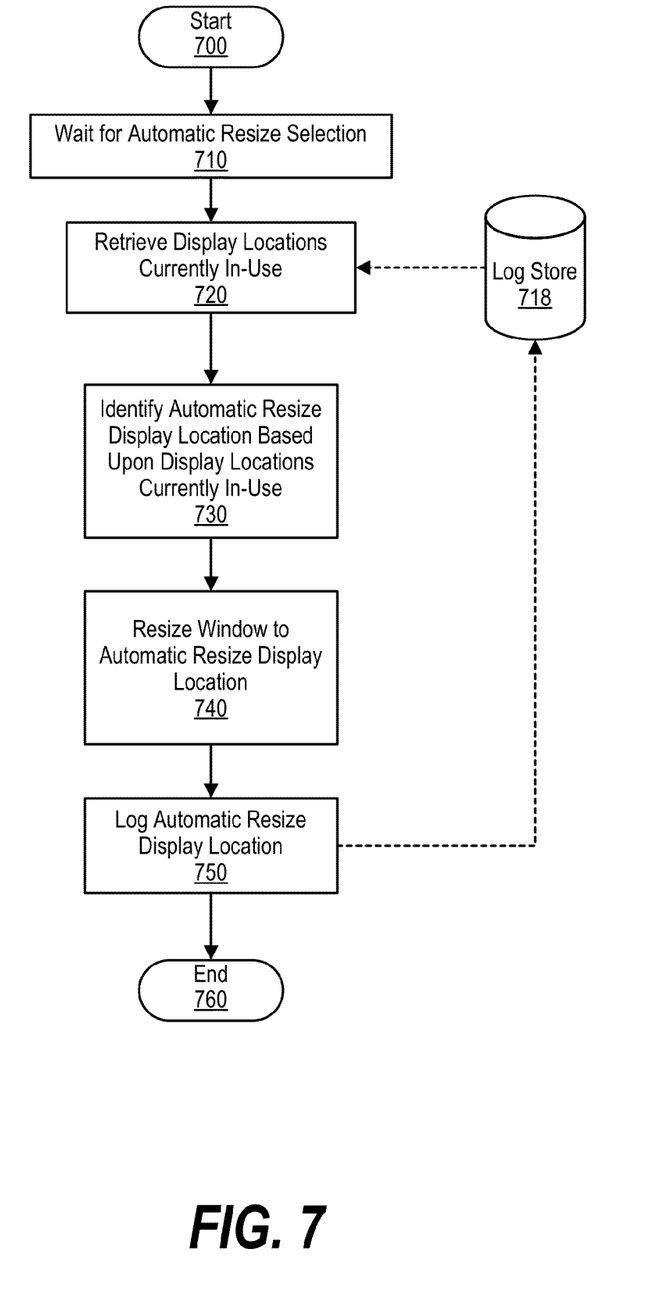
FIG. 7 is a flowchart showing an example of steps taken to automatically resize a window based upon a previously resized window display location.

FIG. 7 is a flowchart showing an example of steps taken to automatically resize a window based upon a previously resized window display location. For example, a user may resize a first window to the left half of a display device and wish to automatically resize a second window based upon the first window's display location (e.g., resize the second window to the right half of the display device).

Processing commences at 700, whereupon processing waits for a user to request to automatically resize a window (step 710). In one embodiment, after a user resizes a first window, processing may display an auto resize option icon on subsequent windows, such as auto resize option icon 230 shown in FIG. 2B. In this embodiment, the user may select the auto resize option icon to automatically resize the corresponding window. In another embodiment, after a user resizes a first window, processing may display an auto resize option on a tiling navigator, such as auto resize option 250 shown in FIG. 2C. In this embodiment, when the user places the cursor over a drop down detection area, processing displays tiling navigator 240, which includes auto resize option. Continuing with this embodiment, the user then selects auto resize option 250 to automatically resize the corresponding window.

At step 720, processing retrieves information for display locations that are currently in use. For example, when a user resizes a window to the left half of a display device, processing logs that the left half of the display device is currently in use (see FIG. 6 and corresponding text for further details). Next, processing identifies an automatic resizing display location based upon the display locations that are currently in use (step 730). For example, if the display locations on the left half of a display device are in use, processing may identify the automatic resizing display location as the right half of the display device. In one embodiment, if multiple automatic resizing display locations are identified, processing may allow the user to select one of the automatic resizing display locations. For example, if the display location in use is the upper corner of the display device, processing may allow a user to select 1) the right half of the display device as the automatic resizing display location, or 2) the lower half of the display device as the automatic resizing display location.

At step 740, processing automatically resizes the window according to the identified automatic resizing display location. Processing then logs the automatic resizing display location in log store 718 for future references as to which display locations are currently in use. In one embodiment, processing tracks windows that close and clears the log accordingly. Processing ends at 760.

Figure 8:
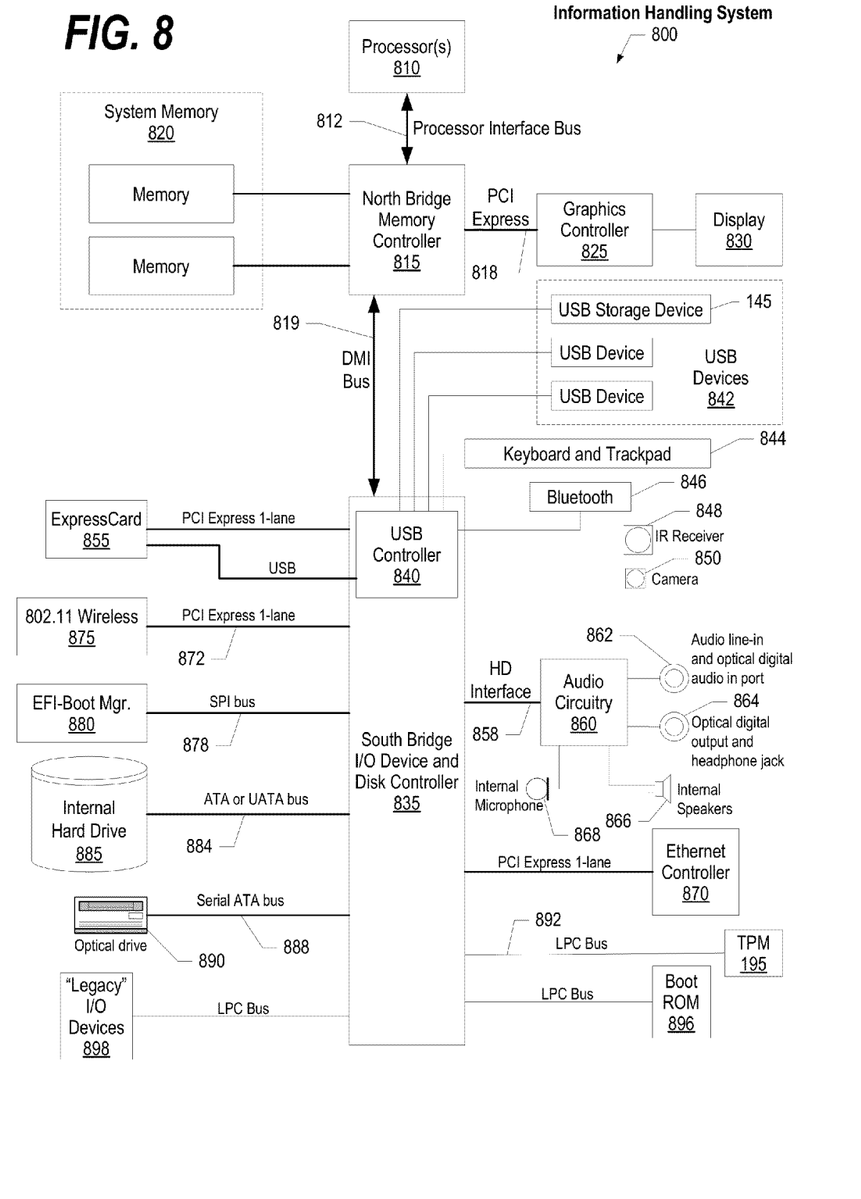
FIG. 8 is a block diagram example of a data processing system in which the methods described herein can be implemented.

FIG. 8 illustrates information handling system 800, which is a simplified example of computing device 105 (shown in FIG. 1) that is capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wirelessly communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks. The Trusted Platform Module (TPM 895) shown in FIG. 8 and described herein to provide security functions is but one example of a hardware security module (HSM).

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 9:
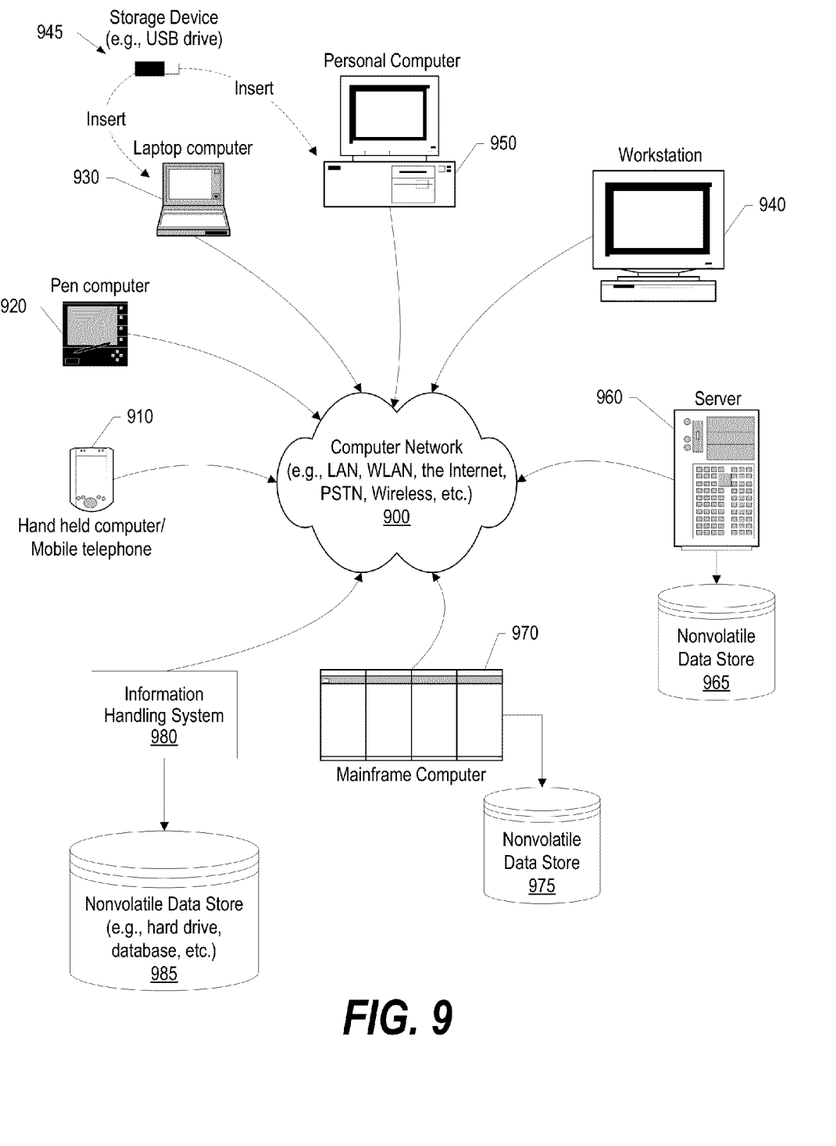
FIG. 9 provides an extension example of the information handling system environment shown in FIG. 8 to illustrate that the methods described herein can be performed on a wide variety of information handling systems which operate in a networked environment.

FIG. 9 provides an extension example of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
displaying a user interface on a display device displaying at least one window, the user interface including a drop down detection area;
detecting a presence of a cursor over the drop down detection area;
displaying a tiling navigator on the display device in response to detecting the presence of the cursor over the drop down detection area, the tiling navigator including a plurality of window resizing options to resize the window to one of a plurality of display locations on the display device; wherein the resizing results in a resized window, the method further comprising:
displaying a subsequent window;
receiving a subsequent user selection to resize the subsequent window;
identifying the resized window's display location;
determining an automatic resizing display location from the plurality of display locations, the automatic resizing display location being substantially devoid of the resized window's display location; and
automatically resizing the subsequent window to the automatic resizing display location.

2. The method of claim 1 wherein the detecting occurs while at least a portion of the user interface is displayed as a window on the display device, wherein the window is selected from a group consisting of an active window and an inactive window.

3. The method of claim 1 wherein at least one of the plurality of window resizing options includes a predefined window arrangement, the predefined window arrangement including a plurality of predefined resizing options that each correspond to one of the plurality of display locations.

4. The method of claim 3 further comprising:
identifying one of the plurality of display locations at which a previously-resized window is located; and
disabling the predefined resizing option corresponding to the identified display location, the disabling preventing a user from selecting the disabled predefined resizing option.

5. The method of claim 1; comprising:
receiving a user selection that selects one of the plurality of window resizing options; and resizing the window to one of the plurality of display locations corresponding to the selected window resizing option.

6. A machine-implemented method comprising:
displaying a user interface on a display device displaying at least one window, the user interface including a drop down detection area;
detecting a presence of a cursor over the drop down detection area;
displaying a tiling navigator on the display device in response to detecting the presence of the cursor over the drop down detection area, the tiling navigator including a plurality of window resizing options to resize the window to one of a plurality of display locations on the display device wherein the tiling navigator includes a priority resize setting and the user selection selects the priority resize setting, the method further comprising:
displaying a priority navigator that includes a plurality of priority resizing options;
receiving a priority user selection that selects one of the plurality of priority resizing options;
storing the selected priority resizing option; and
resizing the window to one of the plurality of display locations based upon the selected priority resizing option.

7. A computer program product stored in a computer readable storage medium that is not a carrier wave, comprising functional descriptive material that, when executed by an information handling system, causes the information handling system to perform actions that include:
displaying a user interface on a display device displaying at least one window, the user interface including a drop down detection area;
detecting that a cursor hovers over the drop down detection area;
displaying a tiling navigator on the display device in response to detecting that the cursor hovers over the drop down detection area, the tiling navigator including a plurality of window resizing options to resize the window to one of a plurality of display locations on the display device;
wherein the tiling navigator includes a priority resize setting and the user selection selects the priority resize setting, and wherein the functional descriptive material that, when executed by the information handling system, causes the information handling system to further perform actions that include:
displaying a priority navigator that includes a plurality of priority resizing options;
receiving a priority user selection that selects one of the plurality of priority resizing options;
storing the selected priority resizing option; and
resizing the window to one of the plurality of display locations based upon the selected priority resizing option.

8. The computer program product of claim 7, wherein the instructions further include:
receiving a user selection that selects one of the plurality of window resizing options; and
resizing the window to one of the plurality of display locations corresponding to the selected window resizing option.

9. The computer program product of claim 7 wherein the detecting occurs while at least a portion of the user interface is displayed as a window on the display device, wherein the window is selected from a group consisting of an active window and an inactive window.

10. The computer program product of claim 7 wherein at least one of the plurality of window resizing options includes a predefined window arrangement, the predefined window arrangement including a plurality of predefined resizing options that each correspond to one of the plurality of display locations.

11. The computer program product of claim 10 wherein the functional descriptive material that, when executed by the information handling system, causes the information handling system to further perform actions that include:
identifying one of the plurality of display locations at which a previously-resized window is located; and
disabling the predefined resizing option corresponding to the identified display location, the disabling preventing a user from selecting the disabled predefined resizing option.

12. A computer program product stored in a computer readable storage medium that is not a carrier wave, comprising functional descriptive material that, when executed by an information handling system, causes the information handling system to perform actions that include:
displaying a user interface on a display device displaying at least one window, the user interface including a drop down detection area;
detecting that a cursor hovers over the drop down detection area;
displaying a tiling navigator on the display device in response to detecting that the cursor hovers over the drop down detection area, the tiling navigator including a plurality of window resizing options to resize the window to one of a plurality of display locations on the display device wherein the resizing results in a resized window, and wherein the functional descriptive material that, when executed by the information handling system, causes the information handling system to further perform actions that include:
displaying a subsequent window;
receiving a subsequent user selection to resize the subsequent window;
identifying the resized window's display location;
determining an automatic resizing display location from the plurality of display locations, the automatic resizing display location being substantially devoid of the resized window's display location; and
automatically resizing the subsequent window to the automatic resizing display location.

13. An information handling system comprising:
one or more processors;
a memory accessible by at least one of the processors;
a display device accessible by at least one of the processors;
a set of instructions stored in the memory and executed by at least one of the processors in order to perform actions of:
displaying a user interface on the display device, the user interface including a drop down detection area;
displaying a window on the display device
detecting a presence of a cursor over the drop down detection area;
displaying a tiling navigator on the display device in response to the presence of the cursor over the drop down detection area, the tiling navigator including a plurality of window resizing options to resize the window to one of a plurality of display locations on the display device; wherein the resizing results in a resized window, and wherein the set of instructions, when executed by at least one of the processors, further performs actions of:

displaying a subsequent window;
receiving a subsequent user selection to resize the subsequent window;
identifying the resized window's display location;
determining an automatic resizing display location from the plurality of display locations, the automatic resizing display location being substantially devoid of the resized window's display location; and
automatically resizing the subsequent window to the automatic resizing display location.

14. The information handling system of claim 13 wherein the detecting occurs while at least a portion of the user interface is displayed as a window on the display device, wherein the window is selected from a group consisting of an active window and an inactive window.

15. The information handling system of claim 13 wherein at least one of the plurality of window resizing options includes a predefined window arrangement, the predefined window arrangement including a plurality of predefined resizing options that each correspond to one of the plurality of display locations, and wherein the set of instructions, when executed by at least one of the processors, further performs actions of:

identifying one of the plurality of display locations at which a previously resized window is located; and
disabling the predefined resizing option corresponding to the identified display location, the disabling preventing a user from selecting the disabled predefined resizing option.

16. The information handling system of claim 13 wherein the tiling navigator includes a priority resize setting and the user selection selects the priority resize setting, and wherein the set of instructions, when executed by at least one of the processors, further performs actions of:

displaying a priority navigator that includes a plurality of priority resizing options;
receiving a priority user selection that selects one of the plurality of priority resizing options;
storing the selected priority resizing option; and
resizing the window to one of the display locations based upon the selected priority resizing option.

17. The system of claim 13, wherein the instructions include:

receiving a user selection that selects one of the plurality of window resizing options; and
resizing the window to one of the plurality of display locations corresponding to the selected window resizing option.

\* \* \* \* \*